(12) United States Patent
Evans (10) Patent No.: US 6,977,730 B2
(45) Date of Patent: Dec. 20, 2005

(54) METHOD AND APPARATUS FOR ALIGNMENT OF A PRECISION OPTICAL ASSEMBLY

(75) Inventor: Christoper James Evans, Higganum, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 10/919,726

(22) Filed: Aug. 17, 2004

(65) Prior Publication Data

US 2005/0041257 A1 Feb. 24, 2005

Related U.S. Application Data

(60) Provisional application No. 60/496,096, filed on Aug. 18, 2003.

(51) Int. Cl.$^7$ ................................................ G01B 9/02
(52) U.S. Cl. ..................................... 356/496; 356/511
(58) Field of Search ............................... 356/496, 497, 356/511–513, 516, 489, 495

(56) References Cited

U.S. PATENT DOCUMENTS

| | | | |
|---|---|---|---|
| 6,195,168 B1 * | 2/2001 | De Lega et al. | 356/511 |
| 6,822,745 B2 * | 11/2004 | De Groot et al. | 356/511 |
| 2001/0043333 A1 * | 11/2001 | Groot et al. | 356/511 |
| 2002/0109851 A1 | 8/2002 | Deck | |

OTHER PUBLICATIONS

Peter G. Halverson, et al., Progress Towards Picometer Accuracy Laser Metrology For The Space Interferometry Mission, International Conference of Space Optics, ICSO Dec. 5, 6, 7, 2000, Toulouse, France.
Schmidtlin, Edouard, "Design, assembly and testing of the TCC's (Triple Corner Cubes) for MAM", Jet Propulsion Laboratory, Interoffice Memorandum, Nov. 16, 1999.

* cited by examiner

Primary Examiner—Gregory J. Toatley, Jr.
Assistant Examiner—Patrick J. Connolly
(74) Attorney, Agent, or Firm—Francis J. Caufield (57) ABSTRACT

Interferometric apparatus and methods for assembling and measuring highly precise optical assemblies such as triple corner cubes, and the like. The apparatus and methods use one or more interferometers that can simultaneously measure the shape, orientation, and distance to one or more surfaces.

9 Claims, 6 Drawing Sheets

METHOD AND APPARATUS FOR ALIGNMENT OF A PRECISION OPTICAL ASSEMBLY

CROSS-REFERENCE TO RELATED APPLICATION

This application claims the benefit of priority from U.S. Provisional Patent Application No. 60/496,096 entitled METHOD AND APPARATUS FOR ALIGNMENT OF A PRECISION OPTICAL ASSEMBLY and filed on Aug. 18, 2003, the entire contents of which are incorporated herein by reference.

FIELD OF THE INVENTION

This invention generally relates to the field of interferometry and, more particularly, solves a basic problem in the metrology for assembly and final quality assurance of ultra-high performance space optics.

BACKGROUND OF THE INVENTION

For complex precision optical assemblies, such as the prism assemblies in displacement measuring interferometers or cube corner assemblies, it is frequently required to know and control to extremely tight tolerances the relative positions of reflective surfaces, dihedral angles, and the location of intersections and vertices. Typically, this is achieved using complex combinations of interferometers and/or autocollimators, which define orientations of surfaces, and mechanical indicators which are used, with appropriate mechanisms, to measure displacements. Sometimes mechanical stops are used to provide orientation or position references. See, for example, Peter G. Halverson, et al., Progress Towards Picometer Accuracy Laser Metrology For The Space Interferometry Mission, International Conference of Space Optics, ICSO Dec. 5, 6, 7, 2000, Toulouse, France and E. Schmidtlin, "Wide-Angle, Open-Faced Retroreflectors for Optical Metrology", Photonics Tech Briefs, 23, 3, pp. 15a–16a, 3, 1999. The tolerances on currently required space flight qualified opto-mechanical assemblies are considerably more demanding than those described in the foregoing cited references.

Prior approaches to the metrology of precision optical assemblies such as hollow corner cubes have a number of disadvantages. Principally, they rely on a sequence of independent measurements of multiple degrees of freedom, often using very different metrology tools, all of which must be related to achieve the desired end result, a process that carries with it considerable uncertainty. For example, separate measurements of angles and displacement invite errors due to drift. Further, if the surfaces of the objects to be assembled into the complex optical system are coated with a soft material (e.g., gold), then mechanical indicators and/or locations can cause damage to these coatings. The most common optical devices for measurements during assembly, such as conventional laser Fizeau interferometers, lose track of absolute position if the measurement beam is broken while manipulating the orientation of the assembly under test. To overcome some of these difficulties, one often has recourse to an optical fixture such as a master prism to facilitate multiple surface measurements simultaneously, but these optical fixtures may be themselves unreliable for very high precision assemblies.

Accordingly, it is a primary object of this invention to provide convenient apparatus and methods by which complex ultra high performance space optic assemblies may be measured and/or assembled.

Other objects of the invention will be obvious and will appear hereinafter when the detailed description is read in connection with the accompanying drawings.

SUMMARY OF THE INVENTION

This invention comprises at least one optical measurement system and a mechanical manipulation system to provide accurate surface metrology of the surfaces, of the locations of surfaces and their intersections (real and virtual) in a complex optical assembly. The optical assembly itself may comprise multiple individual optical components or subsystems, which by virtue of their relationship to each other in a common fixture, may be accurately characterized as a group. The optical measurement system is capable of measuring at least one absolute distance, at least one surface shape, and at least one angle between at least two surfaces. Combining the absolute distances and angular information provided by the optical system(s) with the distances and orientation changes generated by the mechanical manipulator system, enables precise measurement of complex geometries. Surface shapes can also be measured, providing extensive characterization of the complex optical assembly in a single set up. Sub-apertures of the optical system may be used to make relative measurements between features (surfaces and intersections) or between features and datums. The optical system may also be combined with manipulators adjusting the relative positions of components during assembly. In an embodiment, the invention combines a optical measurement system with precision staging to locate the line of intersection between two planes.

In an embodiment, the invention combines a optical measurement system with precision staging and fixturing to locate the point of intersection between three planes.

In an embodiment, the invention combines Fourier Transform Phase Shifting Interferometry (FTPSI), precision mechanical staging and the principles of closure and reversal to monitor the assembly of three corner cubes in a common fixture.

BRIEF DESCRIPTION OF THE DRAWINGS

The structure, operation, and methodology of the invention, together with other objects and advantages thereof, may best be understood by reading the detailed description in conjunction with the drawings in which each part has an assigned numeral or label that identifies it wherever it appears in the various drawings and wherein.

DETAILED DESCRIPTION OF THE INVENTION

Figure 1:
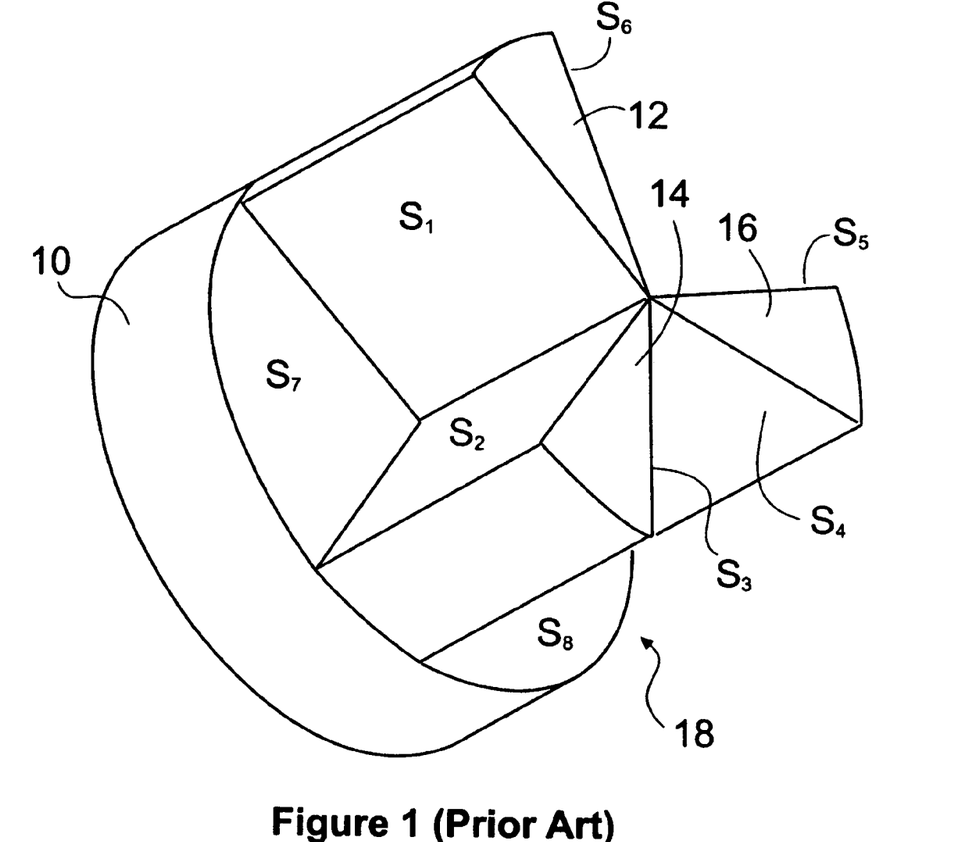
FIG. 1 is a diagrammatic perspective of a cube corner assembly of a type under development for the Space Interferometer Mission and comprises a cylindrical base to which are bonded three separate prism segments.

FIG. 1 shows a schematic of a cube corner assembly 18 comprising a cylindrical base 10 to which are bonded three separate prism segments' 12, 14, and 16. Cube corner assembly 18 is of the type described, for example, by E. Schmidtlin, "Wide-Angle, Open-Faced Retroreflectors for Optical Metrology", *Photonics Tech Briefs*, 23, 3, pp. 15a–16a, 3/1999. Cube corner assembly 18 is representative of the type of complex precision optical assembly the present invention is particularly adapted to measure and facilitate its assembly.

Figure 2A:
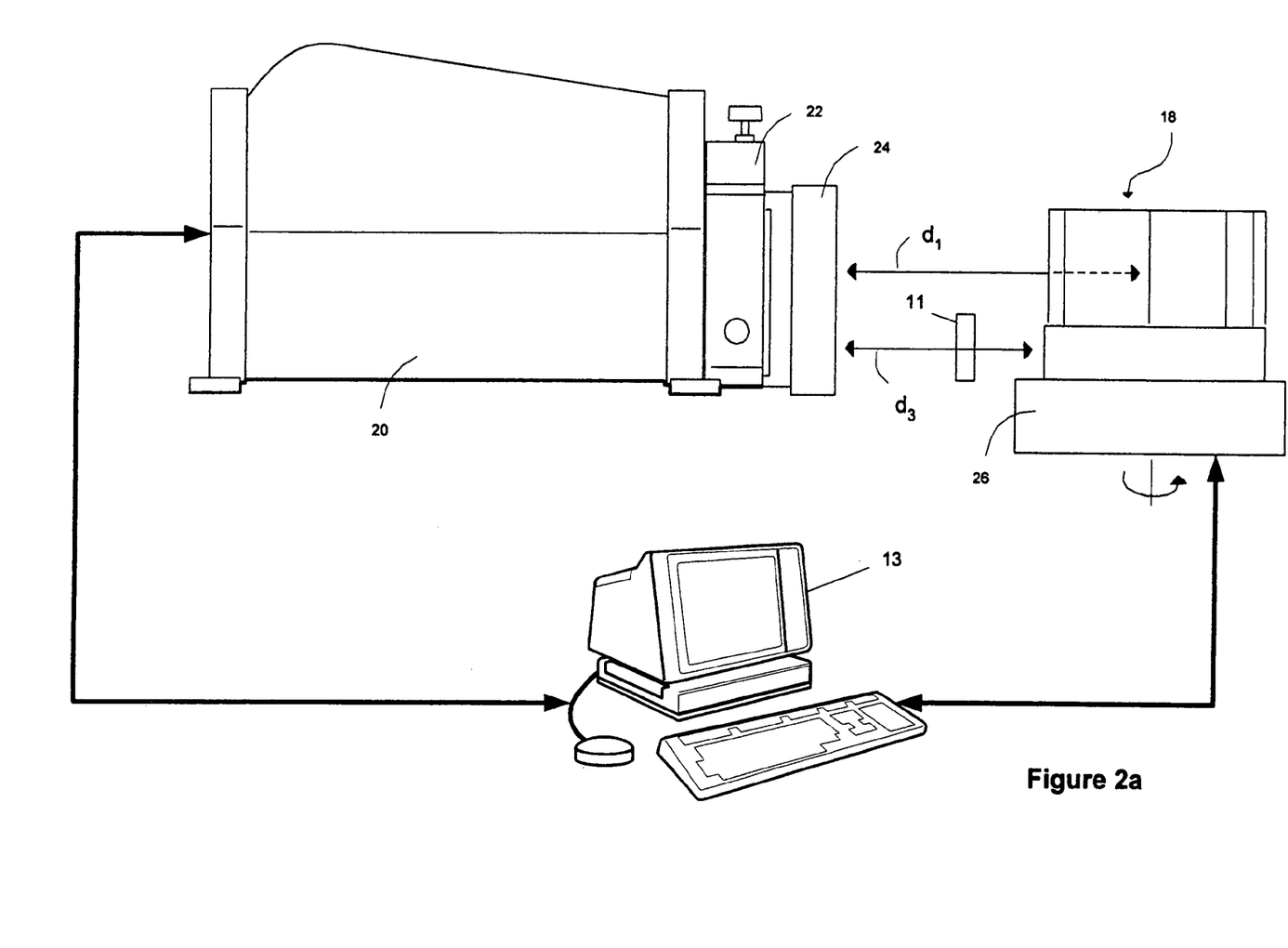
FIG. 2a is a diagrammatic side elevational view of a cube corner assembly located on a precision rotary table adjusted so that the center of the corner cube assembly cylindrical base is on the axis of rotation of the rotary table. An optical system measuring distance to, orientation of, and shape of the surface of the cube corner is also shown along with certain distances measured.

An embodiment of the present invention is shown FIG. 2a, which is a diagrammatic elevational view showing a cube corner assembly 18 located on precision rotary table 26 adjusted so that the center of the cylindrical base 10 is on the axis of rotation of the rotary table 26. An optical system 20 for measuring absolute distance to, orientation of, and shape of the surfaces of the cube corner 18 is also shown. Optical system 20 includes an optical interferometer system which is under the control of a suitably programmed computer 13, preferably equipped with a graphical user interface (GUI) for interacting with system, performing data processing, transferring instructions, displaying results, storing and formatting data, and performing general housekeeping functions. Computer 13 is also adapted in a well-known manner to provide precise control of rotary table 26 and receive feedback information indicating the precise orientation and position of rotary table 26 at any instant in time. Those skilled in the art will recognize that rotary table 26 may alternatively be controlled by controller electronics located separate from computer 13.

Figure 2B:
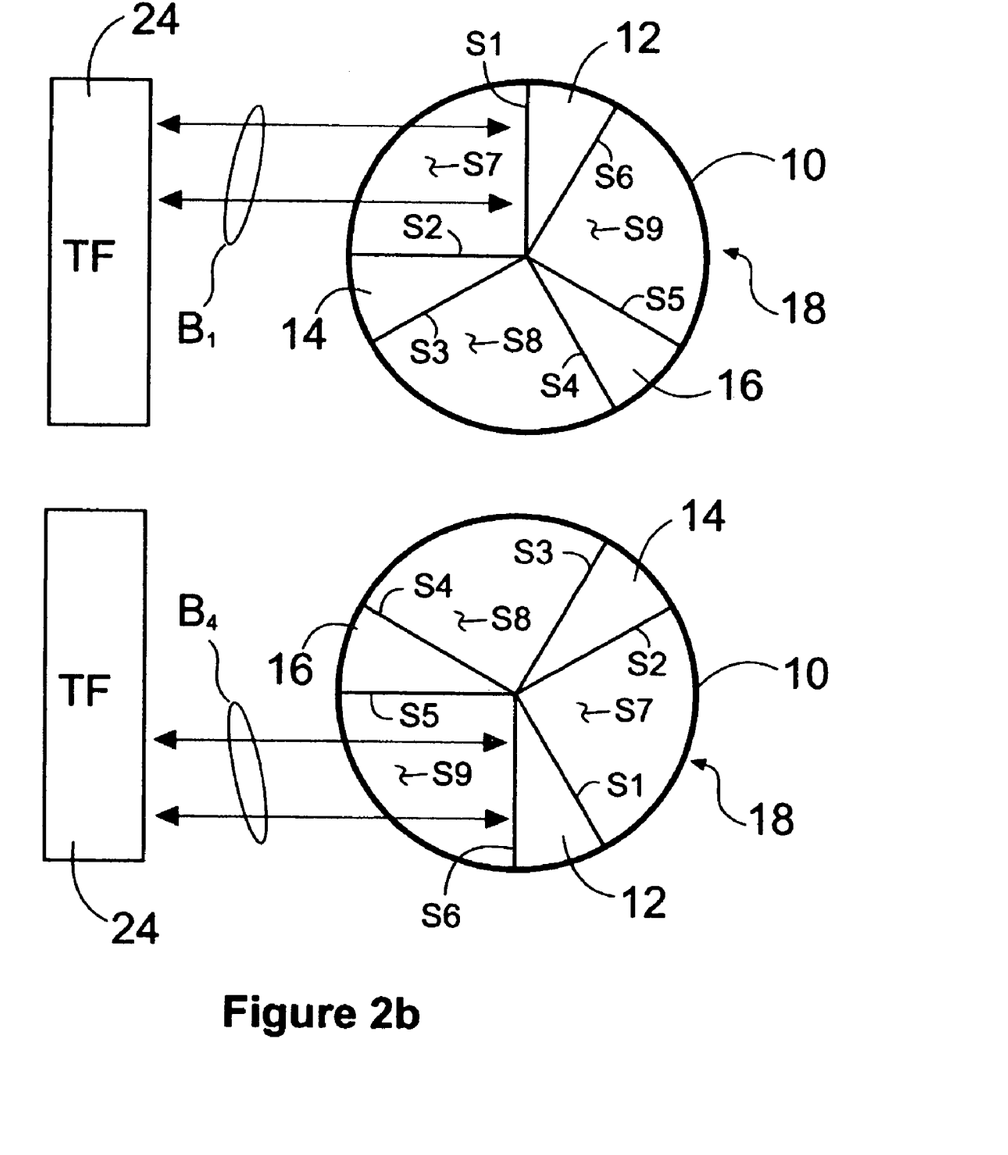
FIG. 2b shows diagrammatic plan views of a reference (transmission) flat of an interferometric instrument measuring segments of a cube corner assembly in different positions along with some of the measurements made.

Reference is now made to FIG. 2b which shows diagrammatic plan views of a reference (transmission) flat 24 (also indicated by TF) of the interferometric optical system 20 measuring segments of cube corner assembly 18 in different angular positions with respect to the TF. Also shown are some of the measurements made while the cube corner assembly is in the various different angular locations.

A number of optical (interferometric) measurement systems are, in principle, capable of simultaneously measuring the orientation of a surface and its distance from some datum, typically the reference surface on the interferometer. Such techniques include, but are not limited to FTPSI ( Fourier Transform Phase Shifting Interferometry), wavelength shifting interferometry, white light interferometry, and coupled cavity interferometry. An assembly of precise motion stages (for example combinations of linear and rotary air bearings) allows sequential presentation of the different surfaces comprising such an optical assembly in front of the optical system. Plane, spherical or cylindrical wavefronts may be used over the entire aperture of the optical measurement system. Alternatively, the measurement system aperture may be subdivided to simultaneously measure different features using different types of wavefront (plane, spherical, etc.). While a number of interferometric optical systems may be used to practice the invention, a preferred interferometric optical system is of the type described in Published U.S. Patent Application No. US-2002-0109851-A1 published on Aug. 15, 2002 in the name of Leslie L. Deck and bearing the title FOURIER TRANSFORM PHASE SHIFTING INTERFEROMETRY, the entire contents of which are incorporated herein by reference. Zygo Corporation, of Middlefield, Conn. also markets such systems under its brand name VeriFire MST™.

Consider the following as an example of how the invention can by used to measure an important complex optical subsystem for a precision space instrument. For the Space Interferometer Mission (SIM), multiple hollow cube corners, retroreflectors, are required with very tight tolerances. Referring again to FIG. 1, one possible design 18 has been illustrated. This design is based on an assembly comprising a common mirror segment that defines a base 10 and three pie-shaped mirror segments, 12, 14, and 16, each with an included angle of 30 degrees. Inasmuch as they comprise a common segment, surfaces S7, S8 and S9 are all in the same plane. Any set of the three adjacent surfaces (for example, S1, S2, and S7) mutually at right angles, all acting in reflection, is a retroreflector. It is required to precisely know the apex angles between the surfaces of the wedge sections (between S1 and S6, S2 and S3, S4 and S5), i.e., the internal nominally 30 degree apex angle, the angles between the surfaces of adjacent wedge sections (i.e., between S1 and S2, S3 and S4, and S5 and S6), the angle between the surfaces of each wedge section and the top surface of the cylindrical base 10 (i.e., between S1 and S7, S2 and S7, S3 and S8, S4 and S8, S5 and S9, S6 and S9), the location of the lines of intersection between plane fits to these surfaces, and the location of the vertices, i.e., the nodal points, of the three hollow cube corners.

Consider first the vertices of the hollow cube corners. The vertex of a cube corner is located at the intersection of three planes; if the three planes physically intersect, it is a real vertex; if one or more of the planes must be extended is space, then the vertex is virtual. In this example, the vertices of all three hollow cube corners are automatically located in the common mirror that defines the plane of the base 10. Now, with the assembly 18 located on precision rotary table 26, the rotary table 26 under the control of computer 13 is used to manipulate the part (i.e., the assembly of segments 12, 14, 16, and circular base 10 with respect to the measuring system 20 (FIG. 2a). The axis of rotation of the rotary table 26 is normal to the axis of the optical measuring system. The optical system 20 again is preferably a Fizeau interferometer using FTPSI; the reference surface (or transmission flat 24) is mounted in a holder 22.

Figure 2C:
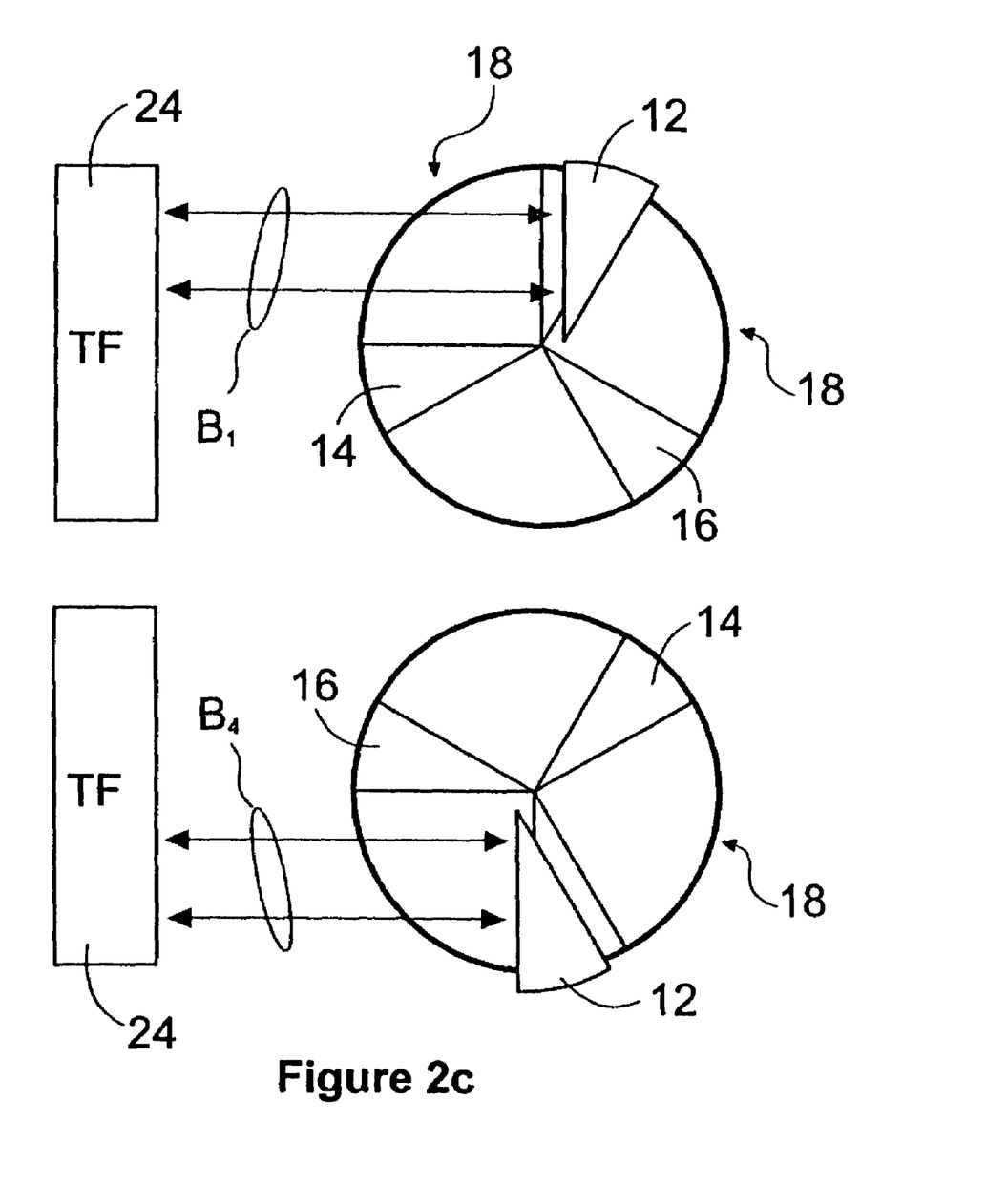
FIG. 2c shows diagrammatic plan views of a reference (transmission) flat of an interferometric instrument used to make certain measurements of segments of a cube corner assembly in different positions during assembly of the cube corner.

The position of the cylindrical base 10 is adjusted so that any desired reference point is on the axis of rotation of the rotary stage 26. A convenient choice of reference is the axis of the cylindrical base 10. This can be located on the rotary axis (centered) by minimizing the run-out using any form of displacement indicator. In the spirit of this invention, the optical system 20 itself may be used with an intermediate focusing lens 11, if required. Such a lens 11 is shown schematically in FIG. 2a measuring the distance $d_3$. Note that the auxiliary lens 11 may be a cylindrical lens producing a wavefront that matches the curvature of the cylindrical base 10 or a spherical lens measuring distance to the cat's eye position. With the chosen reference point appropriately located, the rotary stage 26 is precisely rotated so that the plane surfaces (S1 to S6) are presented sequentially in front of the optical system 20. A plan view of this operation is shown schematically in FIG. 2(b), where the segment 12 is taken to be located such that the extensions of its plane surfaces (S1, S6) pass exactly through the axis of rotation and, hence, through the reference point. In the upper view of FIG. 2b, one surface of segment 12 is parallel to the transmission flat (reference surface 24) of the optical system 20 and the distance $d_1$ from the transmission flat (reference surface 24) to surface S1 on segment 12 can be measured using beams B1 emerging from optical system 20. In the lower portion of left-hand portion of FIG. 2b, the assembly 18 has been rotated to present the opposite surface (S6) of the segment 12 to another portion of the reference surface 24 of the optical system 20. The distance $d_1$ from the reference surface to the segment is the same as was measured in the first position. FIG. 2c is analogous to FIG. 2b except that the segment 12 is shown translated from its desired location (which is also indicated in FIG. 2c. It should be immediately apparent that the difference between the distances $d_1$ from the optical system reference surface 24 to the plane surfaces of the segments (S1, S6) is twice the displacement of the extension of the surfaces comprising that segment from the axis of rotation. Vector combination of displacements of the adjacent surfaces of two adjacent segments (e.g., S1 and S2) gives the displacement of the vertex from the reference point.

It will be appreciated that the invention may be used to facilitate in the assembly of corner cube assemblies by providing precise surface position, orientation, and shape information for each segment of as it is added in the assembly and/or subsequently adjusted to assure that the components and assembly conform to performance specifications. For example, multiple segments may be measured and qualified as matched sets in advance of assembly and then afterwards their positions and orientations may be monitored as assembly proceeds. If the optical measurement system 20 measures the displacement of the outside of the cylinder (distance $d_3$), it can be used to measure the decentration of the center of the cylindrical base 10 on the rotary axis, or to correct displacement data accordingly, thereby rendering precise centering unnecessary. Roundness or cylindricity can also be measured from the $d_3$ data.

Figure 3:
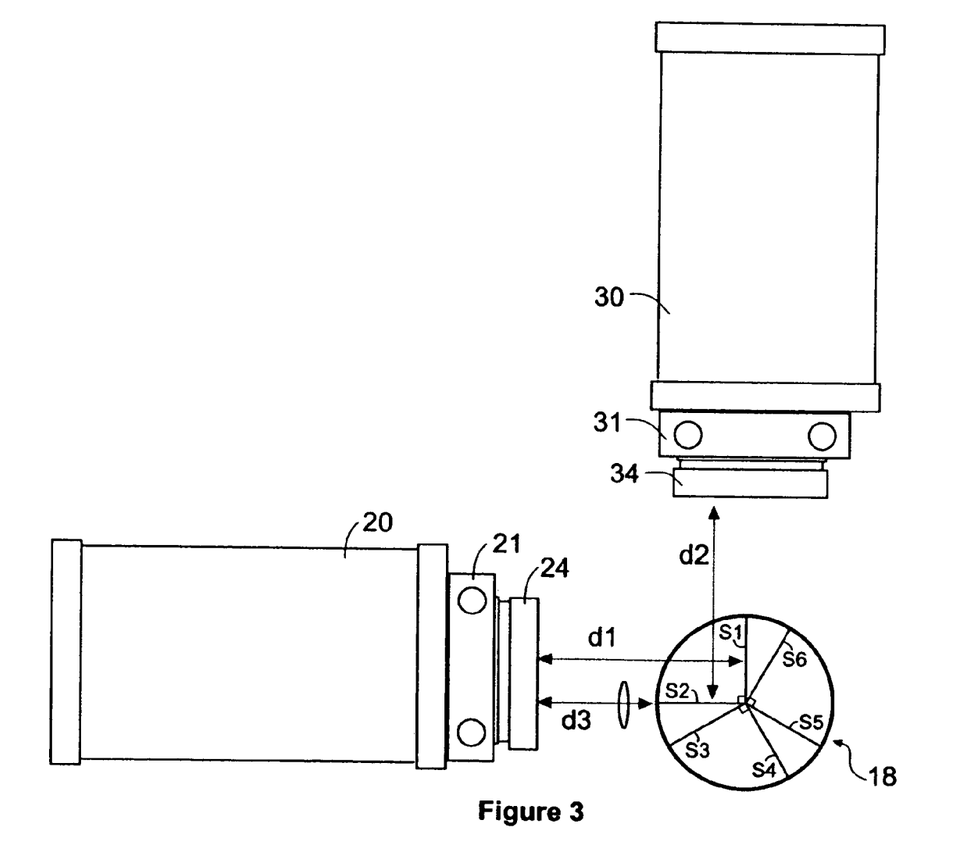
FIG. 3 is a diagrammatic plan view showing the simultaneous measurement of the cylindrical base and various facets comprising a cube corner assembly.

If two optical systems (20, 30) are set up (e.g., FIG. 3) at the nominal angle between two of a set of N planes, i.e., 360°/N, then the angles between surfaces of segments 12 and 14 can be measured in the same set-up by closure, which is a technique of angle metrology well-known to practitioners in the field. The positions of the outside surfaces of the segments, using an auxiliary optical system in a manner analogous to the measurement of $d_3$, can also be measured.

Figure 4:
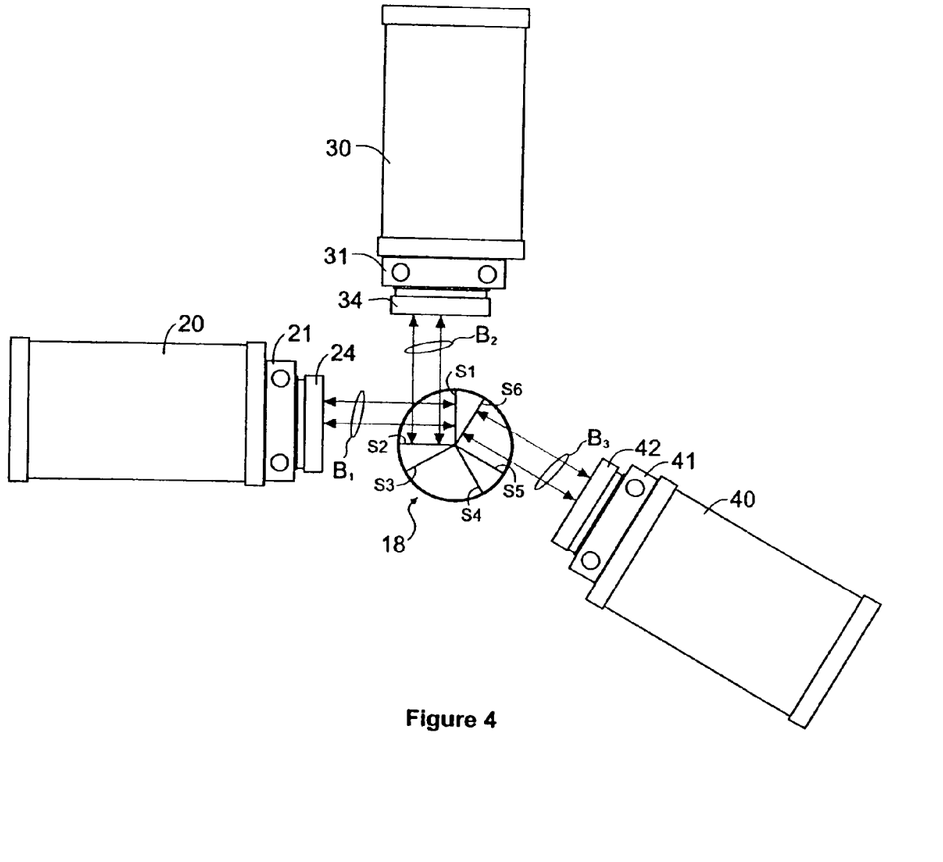
FIG. 4 is a diagrammatic plan view showing various set-ups which may be used together with the well-know techniques of closure to measure angles within a cube corner assembly.

A third optical system 40 may be added to measure different angles in, for example, the set up shown in FIG. 4, which allows measurement of the 120 degree nominal angles between S2 and S6, S2 and S4. Flatness of the surfaces S1, S2, . . . S6 may also be measured. Among the invention's advantages are:

Non-contact, does not damage fragile surface

Can be implemented on highly reflective or low reflectivity polished surfaces.

Simultaneous measurement of multiple critical dimensions during assembly may be carried out to allow conformity to all.

Absolute measurement of relationships between surfaces, despite breaking of the optical beam between/during measurements.

This example is intended only to be illustrative of the invention and its advantages. Those skilled in the art will immediately recognize variants of the basic concepts exemplified above. For example, a simple pentaprism may be inserted to use part of the aperture illuminated by beams B1 to measure the orientation of S7 with respect to S1. Another example is where components of the assembly are transmissive, then measurements of distance and angles though such components may be made. A further example is the combination of measurements with micromanipulators (e.g. as supplied by Physike Instrumente) used, e.g., to precisely position components (such as segments 12, etc) before bonding onto an assembly.

Other variations of the invention will occur to those skilled in the art based on its teachings, and it is intended that all such variations be within the scope of the invention.

What is claimed is:

1. Interferometric measurement apparatus for measuring multi-surfaced optical assemblies, said interferometric measurement apparatus comprising:

at least one interferometric measurement system configured and arranged to measure the shape, orientation, and distance to a surface at which it is directed, said interferometric measurement system having only a single reference surface;

a motion stage for precisely moveably mounting a multi-surfaced optical assembly so that its surfaces can be sequentially presented to said interferometric system for measurement with respect to said single reference surface thereof to provide information indicating the shape, orientation, and distance to each surface measured; and control means for exchanging signals and data between said interferometric measurement system and said motion stage for precisely moveably mounting a multi-surfaced optical assembly, receiving said information from said measurement system about each of said surfaces of said multi-surfaced optical assembly presented to said interferometric measurement system, determining the quality and relationships among said measured surfaces, and providing signals to provide precise control over the location and movement of said measured surfaces in coordination with data acquired by said interferometric measurement system.

2. The interferometric measurement apparatus of claim 1 wherein said interferometric measurement system comprises a Fizeau interferometer with Fourier Transform Phase Shifting Interferometry (FTPSI).

3. The interferometric measurement apparatus of claim 1 comprising at least two interferometric measurement systems each of which has but a single reference surface so that more than one surface may be measured simultaneously with respect to the single reference surface of a corresponding interferometric measurement system.

4. The interferometric measurement apparatus of claim 1 wherein said motion stage for precisely moveably mounting a multi-surfaced optical assembly comprises a precision rotary table.

5. The interferometric measurement apparatus of claim 4 wherein said multi-surfaced optical assembly comprises a radially arranged cube corner assembly.

6. The interferometric measurement apparatus of claim 1 further including a precision mechanical manipulator for precisely placing and adjusting the various components bearing the surfaces of said multi-surfaced assembly to aid in its fabrication by supplying feedback control in coordination with real-time measurement data to monitor the conformity of said multi-surfaced assembly with its performance specifications as it is assembled.

7. The interferometric measurement apparatus of claim 1 wherein the said measured surfaces are nominally planes and said location of said measured surfaces includes the line of intersection between said two planes.

8. The interferometric measurement apparatus of claim 7 wherein the said location of said surfaces includes the point of intersection between three planes.

9. The interferometric measurement apparatus of claim 1 wherein said multi-surfaced optical assembly comprises a group of multiple individual optical components and subsystems located in a common fixture.

* * * * *